Patented Aug. 8, 1933

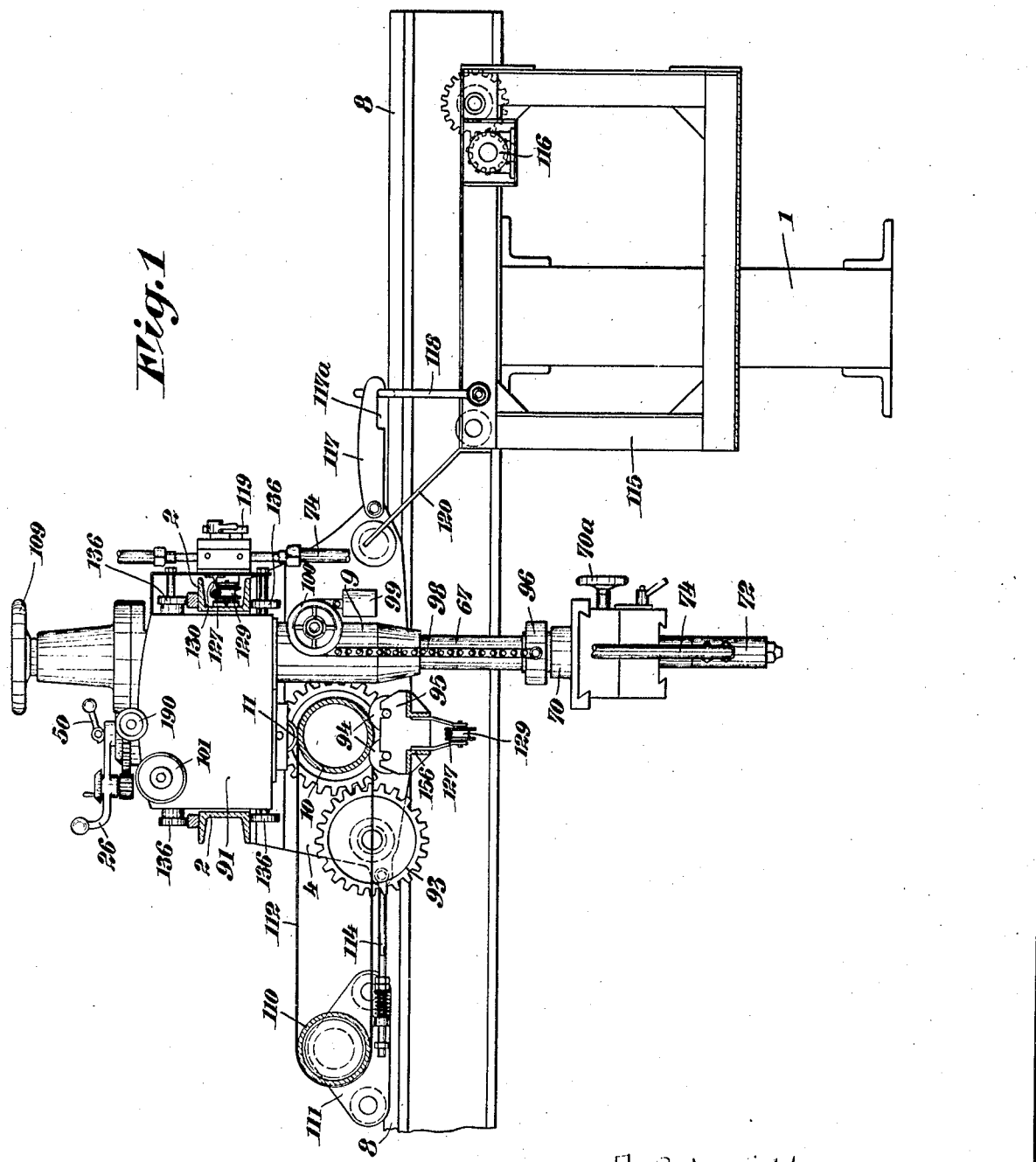

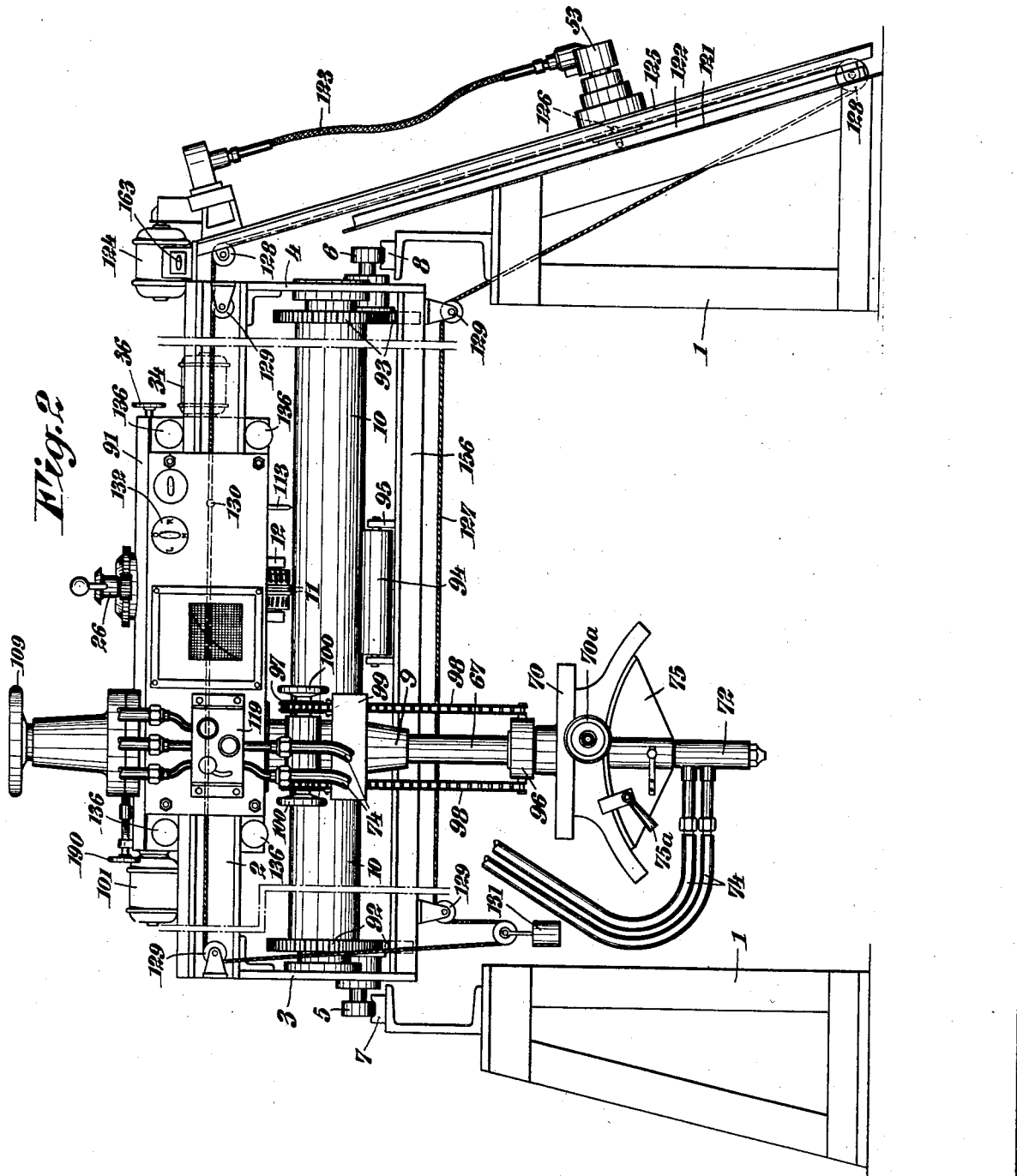

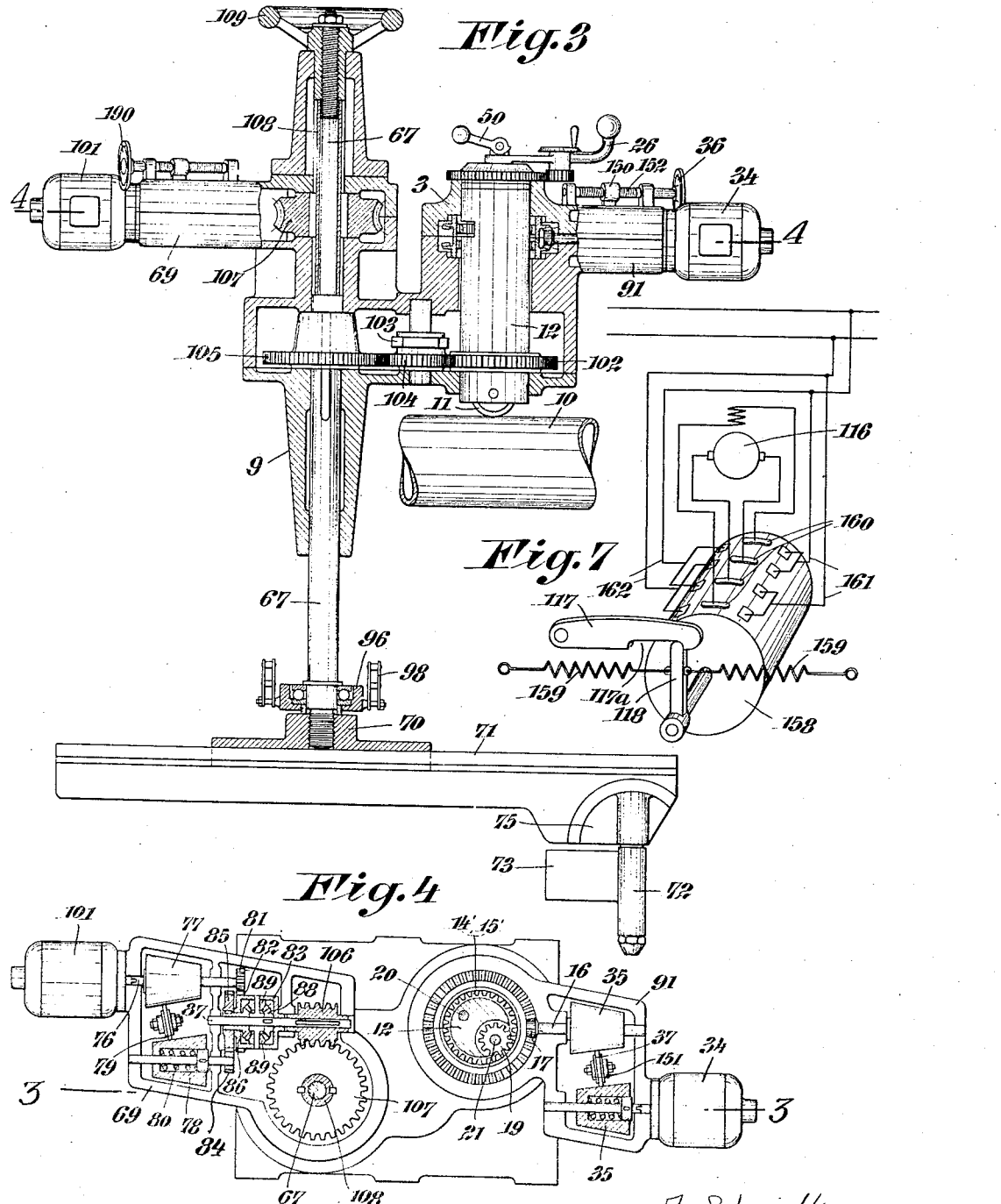

1,921,888

UNITED STATES PATENT OFFICE 1,921,888

MACHINE FOR GUIDING CUTTING OR WELDING BURNERS, ELECTRODES, AND LIKE IMPLEMENTS

Adam Schmidt, Vienna, Austria, assignor to Alfred Vogel, Vienna, Austria

Application November 11, 1932, Serial No. 642,322, and in Austria August 22, 1930

7 Claims. (Cl. 266—23)

In my copending application Serial Number 607,635 filed April 26, 1932, I have described and shown a device for guiding implements, particularly the burner of cutting burner or welding machines in which the cross and transverse or combined movement of the implement holder is effected by rolling a driving wheel, rockable about an axis perpendicular to its axis of rotation, upon the peripheral surface of a tube, the axial displacement of which is directly transmitted to the implement holder, and a rotary movement of which is employed for driving a carriage carrying the entire apparatus.

However owing to its transverse arm carrying the implement holder, the device above mentioned is adapted for small implements only, because the supporting arm of the carriage for the transverse movement of the implement holder must not extend beyond a certain length for constructional reasons and working without shocks.

In order to execute cuts along an outline on the work or according to a template in the event of large works, in the device according to the present invention, the cylindric member co-operating with the driving wheel is mounted rotatable on the carriage but prevented from moving longitudinally, while the implement holder and the driving wheel drive are arranged in a casing which is transversely movable on the carriage. The latter is adapted to the greatest width of the working area disposed underneath of it and can be moved in the longitudinal direction and parallel to the working area on a track enclosing the latter at two sides thereof. The carriage is driven solely by the cylindric member also extending across the whole width of the carriage, said member co-operating with the driving wheel rolling on it. The latter, according to its adjustment with respect to the axis of said cylindric member, either rotates the latter or moves the implement holder parallel to the axis of said member or in any intermediate position rotates the cylindric member as well as moves transversely the implement holder.

Additional objects of the invention will appear in the following specification in which the preferred form of my invention is described.

Figure 5:
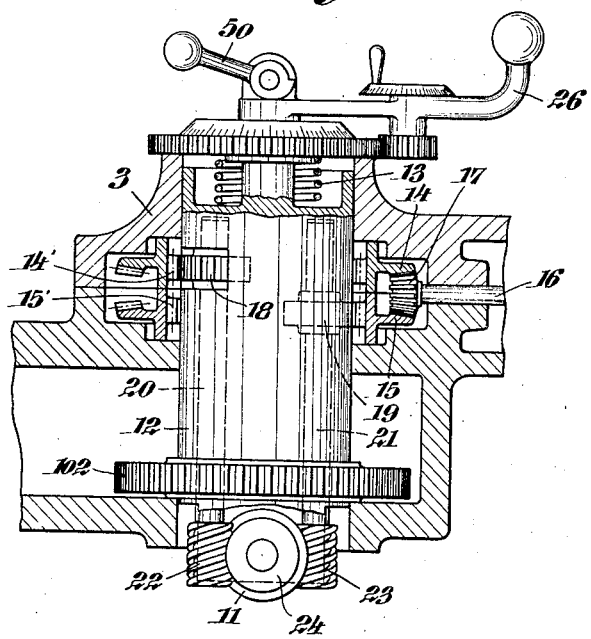
Figure 6:
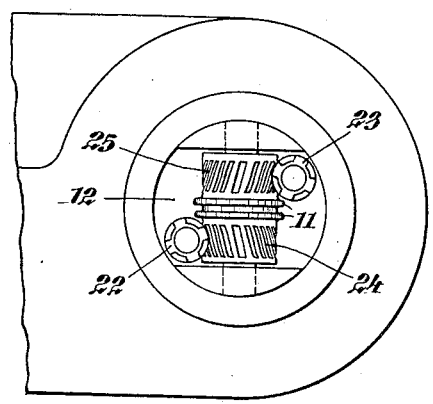

In the drawings, Fig. 1 is a longitudinal section through the machine and Fig. 2 a side view thereof. Figs. 3 and 4 are sectional views of the gear for the driving wheel and the implement shaft, Fig. 3 being a section on line 3—3 of Fig. 4, while Fig. 4 is a section on line 4—4 of Fig. 3. Figs. 5 and 6 show on an enlarged scale the control head in longitudinal section and in inverted plan view respectively. Fig. 7 is a diagrammatic view of the control mechanism for the travelling stage.

A driving motor, a continuously variable change-speed gear, a gear for the driving wheels 11 with their control head 12, are fitted into a common casing block 91, which is so supported by means of rollers 136 or the like as to be longitudinally displaceable on the girder 2 of the carriage. The girder 2 is secured at both ends to bearing plates 3 and 4, which are each equipped with a pair of running rollers 5 and 6 respectively, which are guided in rails 7 and 8, transverse to the girder 2, on the carrying frame 1, and which permit of a displacement of the carriage, parallel to itself. Hereinafter this movement of the carriage is termed longitudinal movement. Underneath the girder 2 is rotatably supported a cylinder 10 in the two bearing plates 3 and 4 of the carriage. This cylinder 10 transmits its rotary movement, for movement of the carriage, by means of the pairs of toothed wheels 92 and 93, to the running rollers 5 and 6 of the two bearing plates 3 and 4. This cylinder 10 is set in rotation by one or more driving wheels 11, which are supported in a control head 12, rotatable and slidable in the bearing casing 91, and having its axis of rotation perpendicular to the axis of the cylinder. The control head 12 rotatable in the bearing casing 91 is subject to the action of a strong spring 13, which bears against the cover of the casing, and, by the pressing of the control head, maintains the requisite application pressure for the driving wheels 11 that drive the cylinder 10. For disconnecting the control head and the driving wheels, there is rockably mounted upon the control head an eccentric lever 50, which bears against the casing cover, and, when actuated, lifts the driving wheels, together with the control head, off the cylinder 10, against the action of the spring 13.

The driving of the driving wheels 11 is effected through the medium of a gear train arranged partly in the control head 12 and partly outside the latter. This gear train includes two rings respectively having bevel teeth 14, 15, rotatably supported in the bearing body 3 and surrounding the control head, these rings being driven in opposite directions by a bevel wheel 17, connected with the driving motor 34 of the machine, and mounted upon a shaft 16 journalled in bearings carried indirectly by the bearing casing 91. Each of the two rings of bevel teeth 14 and 15 is also provided with a ring of internal teeth, 14' and 15', each of which drives a spur wheel, 18 and 19 respectively, supported in the control head 12. The spur wheels 18 and 19 are mounted upon shafts 20 and 21, which are rotatably supported in the control head 12 parallel to its axis of rotation, and are arranged diametrically opposite to one another. The lower ends of the shafts 20 and 21 are provided with unidirected worms 22 and 23, which mesh with worm wheels 24 and 25 on the two driving wheels 11 on opposite sides, so that the opposite rotary movement produced by the two rings of bevel teeth 14 and 15 is converted by the staggered worm wheels 22 and 23 into a unidirectional rotary movement of the driving wheels 11.

By this arrangement according to the invention of the drive for the driving wheels 11 the technical effect is obtained that the transmission torques and also the peripheral speeds of the two driving wheels 11, even in the case of accidently unequal or of only one-sided loading, remain completely equal owing to the opposite rotation of the two sets of driving wheels, so that the freely rotatable control head, and also the driving wheels 11 journalled therein, can never be arbitrarily altered by the drive, in the event of unequal loading into a direction other than that adjusted by hand. From this there arises the further advantage that a device for fixing the control head in its various positions is quite unnecessary, and the man operating the machine can easily make the unloaded control head 12, without any expenditure of force, follow any desired cutting curve by means of a hand lever 26 or hand wheel adjustable along a scale. A pinion supported on the hand lever 26 and meshing with a ring of teeth secured to the cover of the bearing casing 91, with a hand wheel, enables the adjustment to be accurately effected by the feel. The arrangement of the hand lever 26 in the axis of the control head furthermore facilitates quite considerably the adjusting of the driving wheels 11 to the requisite cutting direction for the tool, since the hand lever 26 need only be kept at the same angle as the line previously drawn on the work, in order to maintain the correct cutting direction for the implement.

The shifting of the driving wheels 11 round the vertical axis of their control head 12 governs the different kind of movement of the driving wheels, and therefore of the implement holder 9.

If the driving wheels 11, in the position illustrated in Figure 3 for example, are directed parallel to the axis of the cylinder 10, they move the casing 91, and therefore the implement holder 9, along the girder 2. If the driving wheels 11 are rotated, by rotating their control head 12, by means of the lever 26, through 90°, they set the cylinder in rotary motion, this motion being transmitted to the running rollers 5, 6 of the carriage by means of the pairs of toothed wheels 92, 93, and thereby effects a longitudinal displacement of the carriage 2, together with the implement holder 9 arranged thereon. The implement holder can be moved in the opposite direction by merely reversing the control head 12 through 180°.

Upon adjusting the driving wheels 11 into any desired intermediate position a resultant movement parallel to the direction of the hand lever 26 is obtained, wherein the implement, by rotation of a cylinder 10, is moved in the direction indicated by the lever 26.

In order to enable the speed of the driving wheels to be adjusted to the particular cutting speed required a continuously variable change-speed gear is according to the invention interposed between the driving motor 34 arranged on the bearing casing 91 of the carriage and the driving shaft 16 of the gear for the driving wheels 11, this change-speed gear being adjustable by hand to any desired transmission ratio.

This continuously variable change-speed gear consists of two oppositely directed cones 35 supported side by side, which are subject to axial spring pressure and between which is interposed a transmission wheel 37 longitudinally displaceable by means of an adjusting device including a hand wheel 36. This adjusting device consists of a nut 150, which can be shifted in a straight line by means of a spindle drive, and which is attached by means of a fork 151 to the transmission wheel 37, and adjusts the latter directly to the thickness of material to be cut, according to the rotation of hand wheel 36 secured upon the spindle 152. The motor 34 drives one of the two cones 35 directly. This cone, according to the position of the transmission wheel 37, drives the second cone 35 at the desired speed, and the latter transmits the motion imparted to it to bevel wheels 14, 15 by means of the bevel wheel 17 mounted on the shaft 16.

In this manner the driving wheels 11 can be adjusted to the particular speed required for driving the tube that guides the implement holder, and can be guided or rocked quite independently thereof by means of the hand lever 26 rotating the control head, in the direction corresponding to the line previously drawn. In order to support the cylinder 10 against the pressure of the driving wheels 11 rolling upon it, one or more pairs of cylinders 94 engages against the under side of the cylinder 10, and these rest in suitable bearings 95 on two supporting bars 156 fitted to the supporting plates 3 and 4, parallel to the cylinder 10. In the bearing casing 91 the implement spindle 67 is so supported as to be vertically slidable and rotatable. To the implement spindle 67 is rotatably fitted a carrying ring 96, to which are attached two chains 98 hanging upon chain wheels 97, and these, owing to a counter-weight 99 fitted at their free ends, provide a counterpoise for the implement spindle 67 and its implement.

For the adjustment of the height of the implement spindle 67 the chain wheels 97 are provided with hand wheels 100, by rotating which the tool or welding burner 72 is adjustable to the required height.

The implement shaft 67 is here provided with a device for cutting out circular pieces of work and adjustment to the desired cutting angle.

The implement shaft or spindle carries, in a clamping device arranged perpendicularly to its axis, an angle 71, adapted to be fixed by a lever 70a and in this case the cutting or welding burner 72 with the valve casing 73 for the three fuel pipes 74, is adjustably fitted by means of a sector 75 supported in an arcuate guide and secured by a screw 75a or the like. The implement is rotatably and exchangeably inserted in the sector 75. In the round cutting of abutting or welding edges, the welding burner is driven by the implement spindle 67 and rotated round the bearing sleeve at the radius adjusted by means of the angle 71. According to the inclination of the cutting or welding burner all circular cuts can be worked out by means of the sector 75 to provide either abutting or welding edge cuts.

For cutting out circular pieces of work, a separate motor 101 (Figs. 2, 3 and 4) is provided, which drives the implement spindle 67 through the equalizing gear, shown in Fig. 4 likewise fitted in the casing block 91. In this case the motor 34 and the driving wheel gear 14 to 25 are disconnected. The equalizing gear for round cutting consists of two cones 77 and 78, rotatably supported side by side and pointing in opposite directions, which are kept in cooperation with one another by a longitudinally slidable transmission wheel 79. For the shifting of the transmission wheel there serves a spindle drive 190 adjustable by hand. For maintaining the co-operation of the two cones there serves a spring 80, which presses one cone 78 and the transmission wheel 79 toward the other cone 77. The cone 77 is mounted fast upon the driving shaft 76 of the motor 101 and drives the differential casing 83 by means of the toothed wheels 81 and 82. The cone 78 is connected by its toothed wheel 84 with a toothed wheel 85, which in its turn is connected with the hub of one toothed bevel wheel 86 of the differential gear, which revolves loosely upon the shaft 87 of the second differential toothed wheel 88. Between the two differential toothed wheels 86 and 88 are arranged in a known manner the bevel planet wheels 89, which are supported in the differential casing 83. Upon the shaft 87 is also secured a worm 106, which meshes with a worm wheel 107, which is mounted loose upon the implement spindle 67 and is coupled with the latter by means of a clamping nut 109.

The method of working of this gear train is as follows:—

The driving is effected directly through the shaft 76, one cone 77 and the gear wheels, to the differential casing 83. The differential casing drives by means of the planet wheels 89, on the one hand, with the bevel wheel 88, the worm 106 connected with it, and therefore the implement spindle 67, and, on the other hand, through the second bevel wheel 86, by means of the toothed wheels 84 and 85, the second cone 78.

Thus the cones 77, 78 are permanently coupled with one another not by the transmission wheel 79 but also by the differential and, according to the setting of said wheel 79, drive the bevel wheel 88 and thus the implement spindle 67 at the desired speed. While in the one extreme adjustment of the transmission wheel, the bevel wheel 88 of the differential and thus the implement spindle 67 are at a standstill owing to the rapid speed of rotation of the bevel wheel 86, while the bevel wheel 88 drives with the highest speed the implement spindle in the other extreme position of the transmission wheel 79. The combination of this continuous change speed gear with a differential renders it possible to adjust the speed of the implement spindle by means of the transmission wheel 79 from zero to a maximum limited by the effect of the motor 34.

It is therefore possible to adjust the cutting speed for circular cuts accurately for any diameter by means of the spindle drive 190 on a suitable scale. By the adjusting of the cutting speed for the round cutting by means of the continuously variable change-speed gear fitted to the casing block 91, not only is the speed adjusted to the diameter and thickness of material of the workpiece in question on circular cutting, but at the same time the cutting speed of all other kinds of cutting that can be carried out with the machine is determined for the same thickness of material, so that in the case of workpiece of the same thickness, and continuous change of cutting, the work involved in changing over the change-speed gear from one kind of cutting to the other is saved.

In Figures 3 and 4 of the drawings are diagrammatically illustrated the driving members of the implement spindle, which provide for the positive rotating of the implement spindle on the one hand from the control head 12 and on the other hand from the equalizing gear 69. The control head 12 is provided with a ring of teeth 102, with which there meshes an intermediate toothed wheel 104, capable of being engaged and disengaged by means of a shifting lever 103, this intermediate toothed wheel transmitting the motion to a toothed wheel 105, displaceable with the implement spindle 67 by means of a feather key and key-way.

The implement spindle 67 can therefore be axially displaced at will to adjust the height of the implement, notwithstanding the fact that it is positively connected by the toothed wheels 102, 104, and 105 with the control head 12.

This connection of the implement spindle 67 with the control head 12 renders it possible to rotate the implement spindle positively in parallel with the control head 12 by hand by means of the adjusting lever 26. The positive rotating of the implement spindle 67 is necessary in working out inclined caulking or welding edge cuts, in which the cutting burner is adjusted at the requisite angle to the work by means of the sector 75 on the implement spindle.

If, however, the machine is to be adjusted to round cutting, the drive 34 for the driving wheels 11 and the control head 12 is disconnected, and the toothed wheel 105 of the implement spindle 67 is separated from the ring of teeth 102 of the control head by disengaging the intermediate toothed wheel 104. The motor 101 for round cutting drives the equalizing gear 69, which co-operates by the worm 106 with the worm wheel 107 adapted to be coupled to the implement spindle 67. The coupling of the worm wheel 107 to the implement spindle 67 consists of a sleeve 108 mounted loose upon the latter, this sleeve being tightened by means of a nut 109 mounted upon a screw-threaded portion of the implement spindle. The worm wheel 107 is prevented from rotating upon the sleeve 108 by means of a feather key and key-way, but permits of a displacement thereof for the purpose of altering the height of the implement spindle 67.

For cutting out circular figures there is secured to the implement spindle 67 the radial arm 71 illustrated in Figure 3, by means of which the cutting burner 72 can be adjusted to the desired diameter 72.

While the drive 101 drives the implement spindle through the medium of the equalizing gear 69 during round cutting, and the connection between the control head 12, and the implement spindle 67 is interrupted by disengaging the intermediate toothed wheel 104, the drive 101 for round cutting is connected before the normal cutting of the machine by releasing the sleeve 108 by means of the nut 109 from the implement spindle 67, and thereupon establishing the connection of the latter with the control head 12 by engaging the intermediate toothed wheel 104.

For guiding the implement according to a drawing the following device is provided on the machine:—

In parallel with the cylinder 10 a second cylinder 110 is rotatably supported in a carriage 111 displaceable on the rails 7, 8. Over the two cylinders 10 and 110 runs an endless band 112, carrying the drawing forming the pattern for the guidance of the implement. On the under side of the casing block 91 is fitted a pointer 113, by means of which the eye of the operator may be aided in following along the line drawn in advance. When the cylinder 10 rotates, the band 112 is also set in motion. If under these circumstances the pin 113 receives motion along the line drawn in advance by parallel adjustment of the lever 26 of the control head 12, the cutting burner moves at the same time in the desired cutting lines on the work.

In order to keep the band in a stretched condition, the carriage 111 of the cylinder 110 is provided on each side with an adjustable tensioning device 114, which bears against the machine the end elements 3, 4 to which it is secured.

To facilitate the operating of the device there runs upon the rails 7 and 8 on the machine frame 1 a travelling stage or platform 115, which is driven independently of the machine by a motor 116 of its own. In order to make the travelling stage 115 positively independent of the movement of the girder 2 there is pivotally fitted, as shown in Figure 1, to one of the two end plates 3, 4, a disengageable pawl 117, which co-operates with a switch lever 118 arranged on the travelling stage, this switch lever actuating an electric reversing switch for the driving motor 116 of the travelling platform 115. The switch lever 118, connected with a contact cylinder 158, is influenced by a spring 159 tending to keep it constantly in the position shown in Figure 5. In this position the contacts 160 for placing in circuit the motor 116 are disposed between the rows of contacts 161 and 162 of the contact cylinder 158, so that the circuit for the motor 116 is interrupted. When the machine is working and the implement holder is moving to and fro on the rails 7 and 8, the pawl 117 rocks the switch 118 in one direction or the other. Thereby the contact cylinder 158 is rotated clockwise or anti-clockwise, so that the motor 116 is connected in circuit for forward or backward running by the co-operation of the contacts 160 with the row of contacts 161 or 162 of the contact cylinder 158, whereby the travelling platform 115 moves forward or backward. The motor 116 is automatically switched off by the lever 118 subjected to the action of the spring 159, this taking place in the moment in which the platform 115 still moves on while the carriage has come to a standstill already and the lever 118 is moved by the spring 159 into its upright position within the recess 117a of the pawl 117.

Since the cutting burner 72, the controlling device, the gas cocks, and the pattern drawing, are arranged one above the other, everything that has to be observed or actuated during the work lies within the field of vision or within convenient range of the operator. To the travelling platform is fitted a protecting glass 120 by which only the region of the burner flame is covered, while the field of vision of all the adjusting members of the machine remains completely free, so that the operator can work without protective spectacles.

For the repeated cutting of similar figures, a template 122 to be secured to one standard of the machine frame on a plate 121, as shown in Figure 2, is employed. For taking the shape of the template there serves, as in the first constructional example, a guiding head 53 known in itself, which is driven by means of a flexible shaft 123 or a guiding shaft from a separate motor 124 fitted to the girder 2 of the carriage. Between two guiding rails 125 secured to the girder 2, the guiding head 53 is guided as regards height above the plane of the template, so that the guiding head is freely movable in the guiding direction of the rails 125, but, in the case of a horizontal movement, positively moves the girder 2 transversely, together with the casing block 91, and the cutting burner 72, according to the space of the template 147. For the simultaneous longitudinal movement of the casing block 91 and of the implement 72 on the girder 2 of the carriage, the guiding head 53 is connected at the point 126 with an endless tension cable 127, which is guided on the one hand by means of rollers 128 along the rails 125, and on the other hand by means of the rollers 129 along the girder 2, the upper lap of the tension cable 127 being secured at the point 130 to the casing block 91 of the controlling device. A weight 131 interposed in the tension cable 127 keeps the cable at the requisite tension. By this tension cable 127 the control head 53 transmits its vertical movement, with simultaneous longitudinal movement of the carriage, to the casing block 91 carrying the implement, as a result of which, besides the longitudinal movement of the implement, a transverse movement thereof is also produced.

The alternative switching on of the motors 34 and 101 is effected by means of an electric switch 132, shown in Figure 2, fitted to the casing block 91. This switch is adjustable into four positions. In the position O both motors are switched off, in the position marked N only the motor 34 for normal cutting is switched on, and in the two positions L and R only the motor 101 for round cutting is switched on for left-hand or right-hand rotation respectively. A separate switch 163 serves for controlling the motor 124 for the control head 163.

The operations of the various kinds of cutting will now be comprehensively described.

Assuming that the machine is to work on normal cutting, the cutting line is marked on the work, disposed underneath the carriage, and the implement has to be guided by hand.

The driving motor 34 is switched on, and drives the driving shaft 16 of the gear for the driving wheels 11 through the continuously variable change-speed gear 35 adjusted in advance to the cutting speed required. The cutting burner is then adjusted to the cutting point by longitudinally displacing the implement holder 9 on the girder 2 of the carriage and displacing the carriage by hand on to the work to be done.

When the machine is completely ready for operation, by rocking the eccentric lever 50, the control head 12 is set free, and the latter, under the pressure of its spring 13, presses the driving wheels 11 against the cylinder 10. The driving wheels 11 will immediately drive the cylinder 10 in the direction given by the position of the adjusting lever 26. By adjusting the adjusting lever 26 into the same direction as the cutting curve drawn in advance, the operator of the machine can without difficulty cut out figures of various shapes, without having to interrupt the cutting operation when the cutting line undergoes a change of direction. For the quick switching off of the drive, the eccentric lever 50 is rocked upwards, and the driving wheels 11 thereby lifted off the cylinder 10 against the action of the spring 13, which results in an instantaneous interruption of the driving movement.

In order to make cuts at an angle to the horizontal plane, the control head 12 is coupled with the implement spindle 67 by placing in engagement the toothed wheel 104 by means of the lever 103. When turning the hand lever 26, the implement spindle 67 is turned always through the same angle and the cutting burner 72 is guided in a plane disposed at a right angle to the cutting plane.

For cutting round designs, the implement shaft 67 is provided with the angle 71, carrying the sector 75 for the inclined adjustment of the burner, and is connected with the equalizing gear 69 for circular cutting by connecting the sleeve 108 by means of the nut 109. The motor 101, operated by the switch 132, now drives the implement spindle 67 by way of the gear 69 adjusted to the required cutting speed, said spindle guiding the cutting burner over the work in a circular path set by the angle 71.

The burner can be guided in accordance with a design on the cylinders 10 and 110 by means of the pin 113 provided at the bottom side of the casing block 91.

For the repeated cutting of like design, the burner 72 is positively guided in accordance with a template 146 by means of the control head 53 of the carriage.

By the fitting of electromagnetic clutches into the individual members of the gear, for instance the reversing members for the implement spindle, the coupling of the implement spindle can be effected electrically simultaneously with the switching on of one of the two motors.

Owing to the fact that separate driving motors are provided on the machine for the driving wheel gear, for the gear for round cutting, for the guiding head of the template and for the travelling stage, no complicated mechanical driving elements are required for the driving of the machine, as a result of which the working is easy, and completely free from vibration.

What I claim is:—

1. Device for guiding implements, particularly the burner of cutting burner or welding machines, comprising in combination a carriage and running wheels for said carriage, a cylindric member rotatably mounted on said carriage, a casing arranged on the carriage and slidable with respect to the latter parallel to said cylindric member, an implement guiding spindle arranged rotatable in said casing, a driving wheel mounted on the slidable casing and rolling on said cylindric member, means in said casing for driving said wheel and said spindle, means to adjust the driving wheel with respect to said cylindric member whereby, in one position thereof, the casing is moved relatively to the carriage and, in another position rotary movement is imparted to said cylindric member, and means connected with said cylindric member and said carriage and transmitting the rotation of said member to the running wheels of said carriage.

2. Device for guiding implements, particularly the burner of cutting burner or welding machines, comprising in combination a carriage, a cylindric member rotatably mounted on said carriage, a casing arranged on the carriage and slidable with respect to the latter parallel to said cylindric member, a spindle guiding the implement arranged rotatable in said casing, a driving wheel rolling on said cylindric member, a control head mounted rotatable in said casing and carrying said driving wheel, a disengageable gear connecting said control head with said spindle, a lever arranged on said control head parallel to said driving wheel and simultaneously rotating said control head, driving wheel and spindle, and means connected with said cylindric member and said carriage and transmitting the rotation of said member to the running wheels of said carriage.

3. Device as claimed in claim 2 further comprising a disengageable intermediate wheel arranged axially slidable in the casing and connecting said gear with said spindle.

4. Device as claimed in claim 1 further comprising a cylinder arranged parallel to and positively slidable with the cylindric member, a band carrying the drawing pattern passing over said cylinder and said cylindric member, and a pin for copying the drawing pattern secured to the casing above the cylindric member.

5. Device as claimed in claim 1 further comprising gas cocks on the casing, and fuel pipes connecting said cocks with the implement, the latter and the drawing pattern being arranged one above the other.

6. Device as claimed in claim 1 further comprising a travelling platform for the operator arranged parallel to the carriage, a motor on said platform, and a control mechanism for the motor arranged on said platform and positively operated by the carriage to control said motor.

7. Device as claimed in claim 2 further comprising an arcuate piece mounted on the implement spindle, a sector adjustably fitted to said arcuate piece, and a burner secured to said sector.

ADAM SCHMIDT.